United States Patent
Burns et al.

(10) Patent No.: US 9,388,265 B2
(45) Date of Patent: Jul. 12, 2016

(54) METHOD FOR PRODUCING SILYL-FUNCTIONALIZED POLYOLEFINS AND SILYL-FUNCTIONALIZED POLYOLEFINS WITH SILYL MONOMER INCORPORATION

(75) Inventors: Gary Thomas Burns, Sunset, SC (US); Francois De Buyl, Hoeilaart (BE); Peng-Fei Fu, Midland, MI (US); Tobin J. Marks, Evanston, IL (US); Valerie Smits, Lobbes (BE)

(73) Assignees: DOW CORNING CORPORATION, Midland, MI (US); NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 13/980,095

(22) PCT Filed: Jan. 17, 2012

(86) PCT No.: PCT/US2012/021558
§ 371 (c)(1),
(2), (4) Date: Sep. 25, 2013

(87) PCT Pub. No.: WO2012/099882
PCT Pub. Date: Jul. 26, 2012

(65) Prior Publication Data
US 2014/0011900 A1    Jan. 9, 2014

Related U.S. Application Data

(60) Provisional application No. 61/434,228, filed on Jan. 19, 2011.

(51) Int. Cl.
| | | |
|---|---|---|
| *C08F 230/08* | (2006.01) | |
| *C08F 4/6592* | (2006.01) | |
| *C08F 210/02* | (2006.01) | |
| *C08J 9/04* | (2006.01) | |
| *C08F 4/659* | (2006.01) | |
| *C08F 210/06* | (2006.01) | |

(52) U.S. Cl.
CPC ............ *C08F 230/08* (2013.01); *C08F 210/02* (2013.01); *C08J 9/04* (2013.01); *C08F 4/6592* (2013.01); *C08F 4/65908* (2013.01); *C08F 4/65912* (2013.01); *C08F 4/65925* (2013.01); *C08F 210/06* (2013.01); *C08J 2323/08* (2013.01); *C08J 2323/14* (2013.01); *C08J 2343/04* (2013.01)

(58) Field of Classification Search
CPC .. C08F 230/08; C08F 4/65908; C08F 4/6592; C08F 4/64013; C08F 210/00; C08F 210/02
See application file for complete search history.

(56) References Cited

U.S. PATENT DOCUMENTS

| | | |
|---|---|---|
| 3,179,612 A | 4/1965 | Plueddemann |
| 3,225,018 A | 12/1965 | Zutty |
| 3,240,768 A | 3/1966 | Guenther |
| 3,258,477 A | 6/1966 | Plueddemann et al. |
| 4,397,981 A | 8/1983 | Doi et al. |
| 4,413,066 A | 11/1983 | Isaka et al. |
| 4,446,283 A | 5/1984 | Doi et al. |
| 4,946,977 A | 8/1990 | Bernhardt et al. |
| 5,132,380 A | 7/1992 | Stevens et al. |
| 5,334,684 A * | 8/1994 | Asanuma et al. ............. 526/279 |
| 5,763,556 A * | 6/1998 | Shaffer et al. .............. 526/348.4 |
| 6,624,254 B1 | 9/2003 | Arriola et al. |
| 6,841,694 B2 | 1/2005 | Pfeiffer |
| 2003/0139621 A1 | 7/2003 | Jacob et al. |
| 2003/0153707 A1 | 8/2003 | Hogan et al. |
| 2005/0080208 A1* | 4/2005 | Mehta et al. ............... 526/124.3 |

FOREIGN PATENT DOCUMENTS

| | | |
|---|---|---|
| EP | 0321258 A2 | 6/1989 |
| EP | 0900801 A1 | 10/1999 |
| EP | 1318153 A1 | 6/2003 |
| EP | 1849816 A1 | 10/2007 |
| GB | 1415194 | 11/1975 |
| JP | 2003-518523 A | 6/2003 |
| JP | 2008-177912 A | 7/2008 |
| JP | 2009-120810 A | 6/2009 |
| PL | 188756 B1 | 4/2005 |
| WO | WO 92/05226 A1 | 4/1992 |
| WO | WO 2005/035600 A1 | 4/2005 |
| WO | WO 2005/103061 A1 | 11/2005 |
| WO | WO 2006/015010 A2 | 2/2006 |
| WO | WO 2010/000478 A1 | 1/2010 |
| WO | WO 2010/000479 A1 | 1/2010 |
| WO | WO 2010/074920 A1 | 7/2010 |

OTHER PUBLICATIONS

English Language abstract for EP 1318153 extracted from espacenet.com database on Mar. 28, 2014, 10 pages.
English Language abstract and translation for JP 2008-177912 extracted from PAJ database on Mar. 28, 2014, 20 pages.
Tsuchida k et al. "Ethene and Propene Copolpmers Containing Silsesquioxane Side Groups" Macromolecules 1997, 30, 2818-2824.
Chen Y. et al. "Constrained Geometry Dialkyl Catalysts. Efficient Syntheses, C-H Bond Activation Chemistry, Monomer-Dimer Equilibration, and a-Olefin Polymerication Catalysis" Organometallics 1997, 16, 3649-3657.
Yang X. et al. "Cationic Zirconocene Olefin Polymerization Catalysts Based on the Organo-Lewis Acid Tris (pentafluorophrnyl). A Synthetic, Structural, Solution Dynamic, and Polymerization Catalytic Study" J. Am. Chem. Soc. 1994, 116, 10015-10031.
Inernational Search Report for Application No. PCT/US2012/021558 dated Jul. 20, 2012, 5 pages.

(Continued)

*Primary Examiner* — Caixia Lu
(74) *Attorney, Agent, or Firm* — Howard & Howard Attorneys PLLC

(57) ABSTRACT

Methods for producing a silyl-functionalized polyolefin with silyl monomer incorporation are provided. The method includes reacting a silicon-containing olefin with an α-olefin, in the presence of a catalytic amount of a group IV catalyst for a time sufficient to produce a silyl-functionalized polyolefin.

8 Claims, No Drawings

(56) References Cited

OTHER PUBLICATIONS

English language abstract and translation for PL 188756. Original document extracted from espacenet.com on Mar. 28, 2014, 5 pages.

Alacid, Emilio et al., "The First Fluoride-Free Hiyama Reaction of Vinylsiloxanes Promoted by Sodium Hydroxide in Water", Advanced Synthesis & Catalysis 348 (15), 2006, pp. 2085-2091.

Chauhan, Moni et al., "Hydrosilylation of Alkynes Catalyzed by Platinum on Carbon", J. Organomet. Chem. 645 (1-2), 2002, pp. 1-13.

Smith, Michael B. et al., "March's Advanced Organic Chemistry-Reactions, Mechanisms, and Structure", Fifth Edition, John Wiley & Sons, Inc., 2001, Chapter 15, pp. 1062-1063.

Stahl, Nicholas G. et al., "Metallocene Polymerization Catalyst Ion-Pair Aggregation by Cryoscopy and Pulsed Field Gradient Spin-Echo NMR Diffusion Measurements", J. Am. Chem. Soc., vol. 125, 2003, pp. 5256-5257.

Zuccaccia, Cristiano et al., "NOE and PGSE NMR Spectroscopic Studies of Solution Structure and Aggregation in Metallocenium Ion-Pairs", J. Am. Chem. Soc., vol. 126, 2004, pp. 1448-1464.

English language abstract for JP 2003-518523 extracted from espacenet.com database on Dec. 14, 2015, 1 page.

English language abstract and machine-assisted English translation for JP 2009-120810 extracted from espacenet.com database on Dec. 14, 2015, 33 pages.

\* cited by examiner

METHOD FOR PRODUCING SILYL-FUNCTIONALIZED POLYOLEFINS AND SILYL-FUNCTIONALIZED POLYOLEFINS WITH SILYL MONOMER INCORPORATION

RELATED APPLICATIONS

This application is the National Stage of International Patent Application No. PCT/US2012/021558, filed on Jan. 17, 2012, which claims priority to and all the advantages of United States Provisional Patent Application No. 61/434,228, filed on Jan. 19, 2011, the content of which is incorporated herein by reference.

FIELD OF THE INVENTION

The present disclosure is generally directed to methods for producing silyl-functionalized polyolefins, and more specifically, methods for producing silyl-functionalized polyolefins using group IV compounds, including metallocene complexes and group IV constrained geometry catalysts.

BACKGROUND

Ziegler-Natta polymerization technology provides opportunities for the production of polyolefins with controlled stereo-regularity and molecular weight. However, due to the lack of appropriate functionality, the polyolefin polymers produced by this technology can be deficient in terms of poor adhesive properties, low affinity for dyes, poor permeability, and low compatibility with more polar polymers, fillers-reinforcing or not- and substrates. The incorporation of functional groups in a hydrocarbon based polymer can dramatically change the chemical and physical properties of the polymer. Unfortunately, current generation Ziegler-Natta catalysts are generally incompatible with polar co-monomers because of catalyst poisoning. Despite various efforts, including using borane co-monomer and monomers with protected polar functionalities, the search for more efficient reaction routes to produce functionalized polyolefins via a coordination polymerization process continues.

The efficient copolymerization of vinylsilanes with α-olefins where silyl-functionalized polyolefins would be generated represents a possible approach to this long-standing problem. Although the copolymerization of α-olefins with allysilanes using Ziegler-Natta type of catalysts has been reported, its copolymerization with bulky and readily available functional vinylsilanes has been very difficult to achieve. Silyl-functionalized polyolefins would not only offer novel physical and chemical properties, but could also be used as a precursor for making other functionalized polyolefins because the silyl group is easily modified and can be used to further crosslink the polyolefin.

JP 2008-177912 discloses copolymerization of a specific alkenyl silane ingredient [D] to two or more alpha olefin under metallocene system polymerization catalyst. The alkenyl silane (D) has the structure (IV) shown below

(IV)

($R^2$ is hydrogen, halogen, or a hydrocarbon group of the carbon numbers 1-4 among formula (IV), and three $R^2$ may be the same or may differ.) $R^8$ and $R^9$ may be the same, or may differ from each other, and are hydrogen or a hydrocarbon group of the carbon numbers 1-4. m is 0 or 1. Paragraph [087] mentions as examples: allyltrimethylsilane, vinyltrimethylsilane, an allyltriethylsilane, vinyltriethylsilane. However, copolymerization with vinyltrimethylsilane results in poor co-monomer incorporation rate as will be shown in the examples.

U.S. Pat. No. 4,413,066 discloses crosslinkable polyethylene resin composition comprising a unit of ethylene and a unit of an ethylenically unsaturated silane compound obtained under high pressure conditions using an autoclave.

U.S. Pat. No. 4,397,981 discloses copolymerization of ethylene and an unsaturated silane compound, most preferred being vinyltrimethoxysilane, vinyltriethoxysilane and gamma-methacryloxypropyltrimethoxysilane, under autoclave.

U.S. Pat. No. 3,225,018 discloses copolymerizing ethylene and a vinyltrialkoxysilane in contact with a free radical catalyst at high pressure.

U.S. Pat. No. 4,446,283 discloses a copolymer consisting essentially of ethylene and an unsaturated silane compound represented by the formula $CH_2=C(R)COO(CH_2)_xSiR'_y(OCH_3)_{3-y}$ wherein R is hydrogen or a $C_1$ to $C_4$ alkyl group, R' is a $C_1$ to $C_4$ alkyl group, x stands for an integer from 1 to 6, a and y stands for 0, 1 or 2. The copolymer is also obtained under high pressure conditions typically in autoclave.

EP 1 849 816 discloses silane group containing polyolefin which has been obtained by copolymerisation. In the case of polyolefins, preferably polyethylene, the copolymerisation is preferably carried out with an unsaturated silane compound represented by the formula $R^1SiR^2_qY_{3-q}$ (II) wherein $R^1$ is an ethylenically unsaturated hydrocarbyl, hydrocarbyloxy or (meth)acryloxy hydrocarbyl group, $R^2$ is an aliphatic saturated hydrocarbyl group, Y which may be the same or different, is a hydrolysable organic group and q is 0, 1 or 2. The most preferred compounds are vinyl trimethoxysilane, vinyl bismethoxyethoxysilane, vinyl triethoxysilane, gamma_(meth)acryloxypropyltrimethoxysilane, gamma(meth)acryloxypropyltriethoxysilane, and vinyl triacetoxysilane.

SUMMARY

Embodiments of the invention as described herein meet that need by providing novel synthesis routes to produce silyl-functionalized polyolefins using group IV compounds, including metallocene complexes and group IV constrained geometry compounds, as catalysts.

In accordance with one embodiment, a method of producing a silyl-functionalized polyolefin is provided and comprises reacting a first functionalized olefin having the formula:

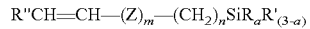

Where Z is an electron withdrawing moiety, m in is 0 or 1, n is an integer from 0-30, R represents an alkoxy group, amine group, mercapto group, alkylsilyloxy group or halogen-containing group, a has a value in the range 1 to 3 inclusive; R' represents an hydrocarbyl group, R" represents H or a group having an electron withdrawing effect or any other activation effect with respect to the —CH=CH— bond or a moiety containing an aromatic ring or a C=C bond conjugated with the —CH=CH— with a α-olefin having the general formula $C_xH_{2x}$, where x is an integer between 1-30, in the presence of a catalytic amount of a group IV catalyst, for a time sufficient to produce a silyl-functionalized polyolefin.

In some embodiments, the α-olefin is selected from the group consisting of ethylene and propylene. R may be independently selected from the group consisting of (NMe$_2$), (Ome), Me$_2$O$^t$Bu and (OTMS).

In some embodiments, the group IV compound comprises a group IV metallocene complex. In some embodiments, a co-catalyst capable of alkylating the group IV catalyst is combined with the catalyst. In one embodiment, the co-catalyst comprises methyl alumoxane.

In some embodiments, the group IV catalyst comprises a group IV metallocene having the formula [(C$_5$Me$_5$)$_2$ZrMe][MeB(C$_6$F$_5$)$_3$], or the formula [(1,2-C$_5$Me$_2$H$_3$)$_2$ZrMe][MeB(C$_6$F$_5$)$_3$], or the formula [(C$_5$H$_5$)$_2$ZrMe][MeB(C$_6$F$_5$)$_3$].

In some embodiments, the group IV compound comprises a group IV constrained geometry catalyst (CGC). For example, the group IV CGC may have the formula Me$_2$Si(C$_5$Me$_4$)(N$^t$Bu)MCl$_2$ where M is selected from the group consisting of titanium and zirconium, or the formula Me$_2$Si(C$_5$Me$_4$)(N$^t$Bu)MCH$_3$][CH$_3$B(C$_6$F$_5$)$_3$] where M is selected from the group consisting of titanium and zirconium.

In another embodiment, a method of producing silyl-functionalized polyolefins with silyl monomer incorporation is provided, the method comprising reacting a silicon-containing vinylsilane with ethylene in the presence of a catalytic amount of a group IV compound for a time sufficient to produce a silyl-functionalized polyolefin.

In some embodiments, the silyl monomer incorporation is greater than 0.5 molar percent, more preferably greater than one molar percent in the resulting polymer.

In yet another embodiment, a silyl-functionalized copolymer is produced which comprises from between about 1 molar percent to about 35 molar percent of a silyl monomer; and from between about 65 molar percent and 99 molar percent of a polyolefin.

These and additional features and advantages will be more fully understood in view of the following detailed description.

DETAILED DESCRIPTION

Embodiments described herein are directed to the production of silyl-functionalized polyolefins via the co-polymerization of an olefin with an α-olefin, wherein at least one of the olefins contains silicon. Simply for ease of understanding, this description will refer to the first functionalized olefin as the silicon-containing olefin. However, it should be appreciated that either of the olefin starting materials may contain silicon, and the designations "first" and "second" are arbitrary. Catalysts for the co-polymerization comprise group IV compounds such as, for example, group IV metallocene complexes or group IV constrained geometry catalysts (CGC).

R is independently selected from alkoxy groups, amine groups, alkylsilyloxy (—OSi(R')$_3$) groups or mercapto groups. Alternatively, R may be a halogen-containing group, for example a halogen group like —Cl. Specific examples of R as used herein include OMe and OTMS. It should be noted that throughout this specification, the chemical notation "Me" corresponds to a methyl group (and may interchangeably be expressed as CH$_3$), and the chemical notation "OTMS" corresponds to a trimethylsilyloxy —O—Si(CH$_3$)$_3$ group.

In a preferred embodiment, the first functionalized olefin used for producing silyl-functionalized polyolefins contains silicon and has the general chemical formula R"CH=CH—(Z)$_m$—(CH$_2$)$_n$SiR$_a$R'$_{(3-a)}$ where Z is an electron withdrawing moiety, m is 0 or 1, n is an integer from 0-30, preferably 1 to 30, alternatively preferably 0, R represents an alkoxy group, amine group, mercapto group, alkylsilyloxy group or halogen-containing group, a has a value in the range 1 to 3 inclusive; R' represents an hydrocarbyl group, R" represents H or a group having an electron withdrawing effect or any other activation effect with respect to the —CH=cH— bond or a moiety containing an aromatic ring or a C=C bond conjugated with the CH=CH group.

An electron-withdrawing moiety is a chemical group which draws electrons away from a reaction center. The electron-withdrawing moiety Z can in general be any of the groups listed as dienophiles in Michael B. Smith and Jerry March; March's Advanced Organic Chemistry, 5$^{th}$ edition, John Wiley & Sons, New York 2001, at Chapter 15-58 (page 1062) provided that the groups are capable of being substituted by a —SiR$_a$R'$_{(3-a)}$ group. The moiety Z can be especially a C(=O)R*, C(=O)OR*, OC(=O)R*, C(=O)Ar moiety in which Ar represents arylene substituted by a —SiR$_a$R'$_{(3-a)}$ group and R* represents a hydrocarbon moiety substituted by a —SiR$_a$R'$_{(3-a)}$ group. Z can also be a C(=O)—NH—R* moiety. Preferred silanes include those of the form CH2=CH—X—Y—SiR$_a$R'$_{(3-a)}$ in which X represents a chemical linkage having an electron withdrawing effect with respect to the CH$_2$=CH— bond such as a carboxyl, carbonyl, or amide linkage, and Y represents a divalent organic spacer linkage comprising at least one carbon atom separating the linkage X from the Si atom.

The electron withdrawing moiety Z is preferably a carboxyl group —C(O)O—. Preferably, m is 1, Z is C(O)O— n is comprised between 1 and 6, a is 3 and R is an alkoxy group.

The α-olefin comprises the general chemical formula C$_x$H$_{2x}$ where x is an integer ≥1, and typically from 1-30. For example, where x=2, the α-olefin is ethylene having the chemical formula C$_2$H$_4$, and where x=3, the α-olefin is propylene having the chemical formula C$_3$H$_6$.

Alpha olefins, or α-olefins, are olefins that have a carbon-to-carbon double bond at the primary or terminal carbon position. In one preferred embodiment, R" is H and the first functionalized olefin is an α-olefin used for producing silyl-functionalized polyolefins contains silicon and, in a first preferred embodiment, has the general chemical formula CH$_2$=CH (CH$_2$)$_n$SiR$_a$R'$_{(3-a)}$, where n ranges from 0 to 30, preferably 0.

In some preferred embodiments, unsaturated silanes such as those for example described in WO2010/000478 and WO2010/000479 may be used as first functionalized olefin. The unsaturated silane can be partially hydrolysed and condensed into oligomers containing siloxane linkage.

Preferably, R" represents a group having an electron withdrawing effect or any other activation effect with respect to the —CH=CH— bond or a moiety containing an aromatic ring or a C=C bond conjugated with the CH=CH group.

In the unsaturated silane of the formula R"—CH=CH—X—Y—SiR$_a$R'$_{(3-a)}$, X is an electron withdrawing linkage and is preferably a carboxyl linkage. Preferred silanes thus have the formula R"—CH=CH—C(=O)O—Y—SiR$_a$R'$_{(3-a)}$. The spacer linkage Y can in general be a divalent organic group comprising at least one carbon atom, for example an alkylene group such as methylene, ethylene or propylene, or an arylene group, or a polyether chain, e.g., polyethylene glycol or polypropylene glycol. When the group R" represents hydrogen and Y is an alkylene linkage, the moiety R"—CH=CH—C(=O)O—Y— in the unsaturated silane is an acryloxyalkyl group. Examples of preferred acryloxyalkylsilanes are γ-acryloxypropyltrimethoxysilane, acryloxymethyltrimethoxysilane, acryloxymethylmethyldimethoxysilane, acryloxymethyldimethylmethoxysilane, γ-aeryloxypropylmethyldimethoxysilane and γ-acryloxypropyldimethylmethoxysilane. γ-Acryloxypropyltrimethoxysilane can be prepared from allyl acrylate and trimethoxysilane by the process described in U.S. Pat. No. 3,179,612. γ-aeryloxypropylmethyldimethoxysilane and γ-acryloxypropyldimethylmethoxysilane can similarly be prepared from allyl acrylate and methyldimethoxysilane or dimethylmethoxysilane respectively. Acryloxymethyltrimethoxysilane can be prepared from acrylic acid and chloromethyltritnethoxysilane by the process described in U.S. Pat. No. 3,179,612.

The electron withdrawing linkage X can alternatively be a C(=O)—NH—Y—SiR$_a$R'$_{(3-a)}$ moiety. When the group R" represents a carboxylic acid group, the unsaturated silane is N-(trimethylsilylpropyl)maleamic acid.

The group R'" in the silane of the formula R"—CH=CH—X—Y—SiR$_a$R'$_{(3-a)}$ can alternatively be an alkenyl group, for example R" can be a propenyl group, X a C(=O)O group and Y an alkylene group, with the silane being an alkoxysilylalkyl ester of sorbic acid.

The group R" in the unsaturated silane can be an electron withdrawing group of the formula —X—Y—SiR$_a$R'$_{(3-a)}$, for example an electron withdrawing group where the linkage —X— is a carboxyl linkage. The unsaturated silane can thus be of the form R$_a$R'$_{(3-a)}$Si—Y—O(O=)C—CH=CH—C(=O)O—Y—Si R$_a$R'$_{(3-a)}$, or R$_a$R'$_{(3-a)}$Si—Y—O(O=)C—C≡C—C(=O)O—Y—Si R$_a$R'$_{(3-a)}$. The unsaturated silane can comprise a bis(trialkoxysilylalkyl) fumarate (trans-isomer) and/or a bis(trialkoxysilylalkyl) maleate (cis-isomer). Examples are bis-(γ-trimethoxysilylpropyl) fumarate.

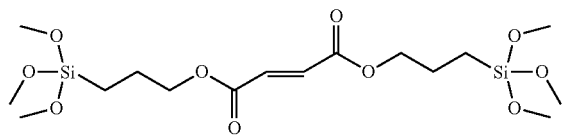

and bis-(γ-trimethoxysilylpropyl) maleate

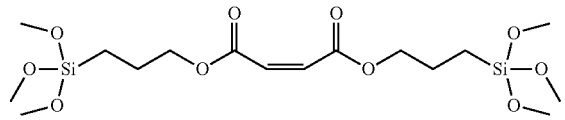

Their preparation is described in U.S. Pat. No. 3,179,612.

Alternatively, the bis-silanes can be asymmetrical e.g. with Y, R and R' being different on each side of the molecule.

Alternatively the electron withdrawing group R" in the unsaturated silane can be of the form XH or XR*, where R* is an alkyl group. The unsaturated silane can be a mono(trialkoxysilylalkyl) fumarate and/or a mono(trialkoxysilylalkyl) maleate, or can be a trialkoxysilylalkyl ester of an alkyl monofumarate and/or an alkyl monomaleate.

The unsaturated silane can also be of the form R$_a$R'$_{(3-a)}$Si—Y—O(O=)C—C=C—C(=O)O—Y—Si R$_a$R'$_{(3-a)}$. Example is bis-(γ-trimethoxysilylpropyl)-2-butynedioate

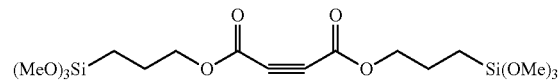

Alternatively methyl substituted cis- and trans-butanedioic acid silanes, such as the derivatives of citraconic acid A and mesaconic acid B and isomers such as the exo-alkylidene substituted itaconic acid derivatives C, in which at least one of the groups R shown below

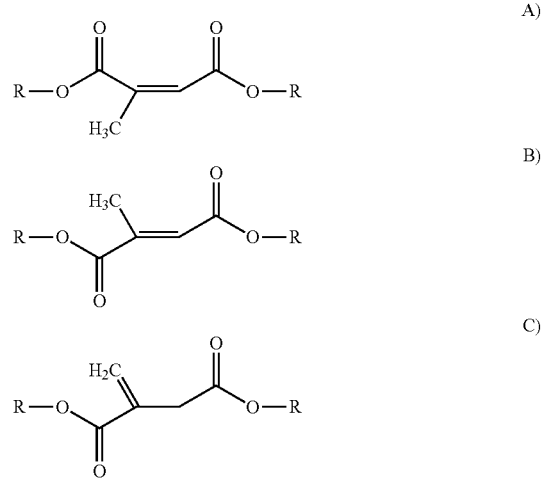

is a —Y—SiR$_a$R'$_{(3-a)}$ group as defined above, can be used as the unsaturated silane. Such unsaturated silanes can be prepared in accordance with U.S. Pat. No. 3,179,612 via substitution reaction of the ammonium carboxylate salt by a haloalkyl silane or in case of Y being a propyl spacer via hydrosilylation reaction of the according alkylesters.

In general, all unsaturated silanes which are silylalkyl esters of an unsaturated acid can be prepared from the unsaturated acid, for example acrylic, maleic, fumaric, sorbic or cinnamic acid, propynoic or butyne-dioic acid, by reaction of the corresponding carboxylate salt with the corresponding chloroalkylalkoxysilane. In a first step, the alkali salt of the carboxylic acid is formed either by reaction of the carboxylic acid with alkali alkoxide in alcohol, as described e.g. in U.S. Pat. No. 4,946,977, or by reaction of the carboxylic acid with aqueous base and subsequent removal of the water via azeotropic distillation, as described e.g. in WO-2005/103061. A trialkyl ammonium salt of the carboxylic acid can be formed by direct reaction of the free carboxylic acid with trialkyl amine, preferentially tributyl amine or triethyl amine as described in U.S. Pat. No. 3,258,477 or U.S. Pat. No. 3,179,612. In a second step the carboxylic acid salt is then reacted via nucleophilic substitution reaction with the chloroalkylalkoxysilane under formation of the alkali chloride or trialkylammonium chloride as a by-product. This reaction can be performed with the chloroalkylalkoxysilane under neat condition or in solvents such as benzene, toluene, xylene, or a similar aromatic solvent, as well as methanol, ethanol, or another alcohol-type solvent. It is preferable to have a reaction temperature within the range of 30 to 180° C., preferably within the range of 100 to 160° C. In order to speed up this replacement reaction, phase transfer catalysts of various kinds can be used. Preferable phase transfer catalysts are the following: tetrabutylammonium bromide (TBAB), trioctylmethylammonium chloride, Aliquat® 336 (Cognis GmbH) or similar quaternary ammonium salts (as e.g. used in U.S. Pat. No. 4,946,977), tributylphosphonium chloride (as e.g. used in U.S. Pat. No. 6,841,694), guanidinium salts (as e.g. used in EP0900801) or cyclic unsaturated amines as 1,8-diazabicyclo[5.4.0]undeca-7-ene (DBU, as e.g. used in WO2005/103061). If necessary, the following polymerization inhibitors can be used throughout preparation and/or purification steps: hydroquinones, phenol compounds such as methoxyphenol and 2,6-dig-butyl 4-methylphenol, phenothiazine, p-nitrosophenol, amine-type compounds such as e.g. N,N'-diphenyl-p-phenylenediamine or sulfur containing compounds as described in but not limited to the patents cited above.

Blends of unsaturated silanes can be used, for example a blend of γ-acryloxypropyltrimethoxysilane with acryloxymethyltrimethoxysilane or a blend of γ-acryloxypropyltrimethoxysilane and/or acryloxymethyltrimethoxysilane with an unsaturated silane containing no electron withdrawing groups such as vinyltrimethoxysilane or with an acryloxysilane containing 1 or 2 Si-alkoxy groups such as acryl oxymethylmethyldimethoxysilane, acryloxymethyldimethylmethoxysilane, γ-acryloxypropylmethyldimethoxysilane or γ-acryloxypropyldimethylmethoxysilane.

Groups enhancing the stability of the radical formed during the reaction, for example double bond or aromatic group conjugated with the unsaturation of the silane, can be present in the unsaturated silane. The latter groups have an activation effect with respect to the —CH═CH bond.

The unsaturated silane can for example have the formula $CH_2$═CH—$C_6H_4$-A-$SiR_aR'_{(3-a)}$, wherein A represents a direct bond or a spacer group.

If A represents a direct bond in $CH_2$═CH—$C_6H_4$-A-$SiR_aR'_{(3-a)}$(I), the silane is trimethoxysilylstyrene, for example 4-(trimethoxysilyl)styrene. 4-(trimethoxysilyl)styrene can be prepared via the so-called Grignard reaction of 4-bromo-and/or 4-chlorostyrene with tetramethoxysilane in the presence of Magnesium as described in EP-B-1318153 or with tetrachlorosilane and subsequent alkoxylation.

If A represents a spacer group, it can be an organic group such as, for example, a divalent organic group comprising at least one carbon atom, for example an alkylene group such as methylene, ethylene or propylene, or an arylene group, or a polyether chain, e.g., polyethylene glycol or polypropylene glycol. A can be for example a linear or branched alkylene group having 1 to 4 carbon atoms, for example the silane can be 2-styryl-ethyltrimethoxysilane or 3-styryl-propyltrimethoxysilane. Styrylethyltrimethoxysilane is e.g. commercially available from Gelest, Inc as a mixture of meta and para, as well as alpha, and beta isomers.

Alternatively, the spacer group A can comprise a heteroatom linking group particularly an oxygen, sulfur or nitrogen heteroatom. Preferably the heteroatom linking group is selected from the group consisting of —O—, —S—, —NH—, with mercapto (—S—) group being preferred. Examples of unsaturated silanes of this type and their synthesis, for example from vinylbenzylchloride with silylthiolate or aminosilane, are described in WO2006/015010. A preferred silane is vinylphenylmethylthiopropyltrimethoxysilane.

The unsaturated silane can alternatively be of the formula R'"—CH═CH-A-$SiR_aR'_{(3-a)}$, where R'" represents a moiety containing an aromatic ring or a C═C bond conjugated with the CH═CH and A represents a direct bond or a divalent organic linkage having 1 to 12 carbon atoms.

When R" is an aromatic ring, the unsaturated silane can for example be cis/trans beta(trimethoxysilyl)styrene or alpha (trimethoxysilyl)styrene.

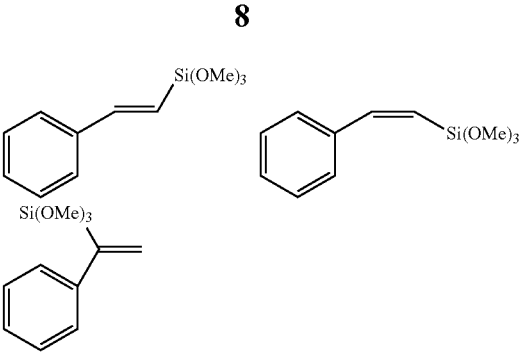

The styrene molecules substituted at the olefinic carbon atoms can be prepared via hydrosilylation reaction of phenylacetylene under organo-metal or metal catalysis as described e.g. in PL-B-188756 or in M. Chauhan, P. Boudjouk et al. J. Organomet. Chem. 645 (1-2), 2002, 1-13. Alternative routes as cross-coupling reaction between vinylalkoxysilanes and aryl bromides or chlorides are described e.g. in E. Alacid et al., Advanced Synthesis & Catalysis 348(15), 2006, 2085-2091.

In some embodiments, R" contains, in addition to the aromatic ring or a C═C bond conjugated with the C═C or C≡C bond, a moiety having an electron withdrawing effect with respect to the —CH═CH— or —C≡C— bond.

In one type of preferred unsaturated silane, A represents an organic linkage A' having an electron withdrawing effect with respect to the —CH═CH— bond. An electron-withdrawing linkage is derived from a electron-withdrawing moiety. Preferred electron-withdrawing linkage are C(═O)O, OC(═O), C(═O)C(═O)—NH—.

The unsaturated silane can alternatively be of the formula R'"—CH═CH-A-$SiR_aR'_{(3-a)}$, where R'" represents a moiety containing an aromatic ring or a C═C bond conjugated with the C═C or C≡C and A represents a direct bond or a divalent organic linkage having 1 to 12 carbon atoms.

In the unsaturated silane of the formula R'"—CH═CH—X—Y—$SiR_aR'_{(3-a)}$(VI), the electron withdrawing linkage X is preferably a carboxyl linkage. Preferred silanes thus have the formula R"—CH═CH—C(═O)O—Y—$SiR_aR'_{(3-a)}$ (VIII). When the group R" represents phenyl, the moiety R"—CH═CH—C(═O)O—Y— in the unsaturated silane (VIII) is a cinnamyloxyalkyl group. The unsaturated silane can for example be 3-cinnamyloxypropyltrimethoxysilane,

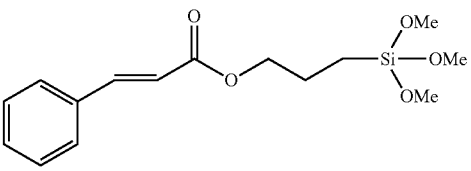 [SMILES: CO[Si](CCCOC(=O)/C=C/c1ccccc1)(OC)OC]

whose preparation is described in U.S. Pat. No. 3,179,612. Preferably the group R'" can be a furyl group, for example a 2-furyl group, with the silane being an alkoxysilylalkyl ester of 3-(2-furyl)acrylic acid, i.e.,

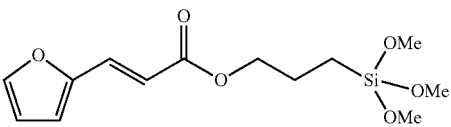 [SMILES: CO[Si](CCCOC(=O)/C=C/c1ccco1)(OC)OC]

Alternative preferred unsaturated silanes have the formula $R^2$—CH=CH—CH=CH-A'-$SiR_aR'_{(3-a)}$, where $R^2$ represents hydrogen or a hydrocarbyl group having 1 to 12 carbon atoms and A' represents an organic linkage having an electron withdrawing effect with respect to the adjacent —CH=CH— bond. The linkage A' can for example be a carbonyloxyalkyl linkage. The unsaturated silane can be a sorbyloxyalkylsilane such as 3-sorbyloxypropyltrimethoxysilane $CH_3$—CH=CH—CH=CH—C(=O)O—(CH2)3-Si(OCH3)3, i.e.,

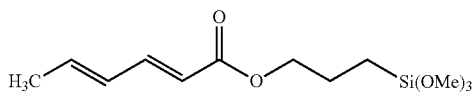

Other preferred unsaturated silanes have the formula A"—CH=CH—CH=CH-A-$SiR_aR'_{(3-a)}$, where A" represents an organic moiety having an electron withdrawing effect with respect to the adjacent —CH=CH— bond and A represents a direct bond or a divalent organic linkage having 1 to 12 carbon atoms.

In general all unsaturated silanes which are silylalkyl esters of an unsaturated acid can be prepared from the unsaturated acid, for example acrylic, maleic, fumaric, sorbic or cinnamic acid, propynoic acid or butyne-dioic acid, by reaction of the corresponding carboxylate salt with the corresponding chloroalkylalkoxysilane. In a first step, the alkali salt of the carboxylic acid is formed either by reaction of the carboxylic acid with alkali alkoxide in alcohol, as described e.g. in U.S. Pat. No. 4,946,977, or by reaction of the carboxylic acid with aqueous base and subsequent removal of the water via azeotropic distillation, as described e.g. in WO-2005/103061. A trialkyl ammonium salt of the carboxylic acid can be formed by direct reaction of the free carboxylic acid with trialkyl amine, preferentially tributyl amine or triethyl amine as described in U.S. Pat. No. 3,258,477 or U.S. Pat. No. 3,179,612. In a second step the carboxylic acid salt is then reacted via nucleophilic substitution reaction with the chloroalkylalkoxysilane under formation of the alkali chloride or trialkylammonium chloride as a by-product. This reaction can be performed with the chloroalkylalkoxysilane under neat condition or in solvents such as benzene, toluene, xylene, or a similar aromatic solvent, as well as methanol, ethanol, or another alcohol-type solvent. It is preferable to have a reaction temperature within the range of 30 to 180 degrees Celsius, preferably within the range of 100 to 160 degrees Celsius. In order to speed up this replacement reaction, phase transfer catalysts of various kinds can be used. Preferable phase transfer catalysts are the following: tetrabutylammonium bromide (TBAB), trioctylmethylammonium chloride, Aliquat®. 336 (Cognis GmbH) or similar quaternary ammonium salts (as e.g. used in U.S. Pat. No. 4,946,977), tributylphosphonium chloride (as e.g. used in U.S. Pat. No. 6,841,694), guanidinium salts (as e.g. used in EP0900801) or cyclic unsaturated amines as 1,8-diazabicyclo[5.4.0]undeca-7-ene (DBU, as e.g. used in WO2005/103061). If necessary, the following polymerization inhibitors can be used throughout preparation and/or purification steps: hydroquinones, phenol compounds such as methoxyphenol and 2,6-di-t-butyl 4-methylphenol, phenothiazine, p-nitrosophenol, amine-type compounds such as e.g. N,N'-diphenyl-p-phenylenediamine or sulfur containing compounds as described in but not limited to the patents cited above.

Blends of hydrolysable unsaturated silanes can be used. For example, an unsaturated silane of the formula $CH_2$=CH—$C_6H_4$-A-$SiR_aR'_{(3-a)}$ and an unsaturated silane of the formula R"—CH=CH-A-$SiR_aR'_{(3-a)}$ can be used together. Alternatively the second olefin can be reacted with a mixture of an unsaturated silane containing an aromatic ring conjugated with the olefinic —C=C— unsaturation of the silane, and another unsaturated silane, which contains an olefinic —C=C— bond or acetylenic —C≡C— bond and has at least one hydrolysable group bonded to Si, but does not contain an aromatic ring, for example vinyltrimethoxysilane.

In general, the molecular weight of the polymer may be controlled by varying the relative co-monomer concentrations as well as the reaction temperature. The copolymerization of the first and second α-olefins proceeds rapidly in the presence of group IV catalysts to provide high molecular weight silyl-functionalized polymers. Typically, a relatively lower molecular weight polymer is produced at higher first α-olefin concentrations and higher reaction temperatures. In one embodiment, the incorporation of the silyl-containing first α-olefin monomer in the co-polymer is in the range of from about 0.1 to about 6.0 mole %. In other embodiments, the incorporation of the silyl-containing α-olefin monomer can be from about 1 to about 40 mole %, or from about 10 to about 25 mole %.

In one embodiment, the concentrations of the α-olefins in the copolymer can be adjusted by changing the pressure or concentration of the α-olefins in the system, as well as the temperature of the reaction. For example, where the second α-olefin is ethylene, the ethylene can be presented as a gas in the pressure range 1 atm to 5000 atm, including from 1 atm to 100 atm, 100 atm to 200 atm, 200 atm to 300 atm, 300 atm to 400 atm, 400 atm to 500 atm, 500 atm to 600 atm, 600 atm to 700 atm, 700 atm to 800 atm, 800 atm to 900 atm, 900 atm to 1000 atm, 1000 atm to 1100 atm, 1100 atm to 1200 atm, 1200 atm to 1300 atm, 1300 atm to 1400 atm, 1400 atm to 1500 atm, 1500 atm to 1600 atm, 1600 at to 1700 atm, 1700 atm to 1800 atm, 1800 attn to 1900 atm, 1900 atm to 2000 atm, 2000 atm to 2100 atm, 2100 atm to 2200 atm, 2200 atm to 2300 atm, 2300 atm to 2400 atm, 2400 atm to 2500 atm, 2500 atm to 2600 atm, 2600 atm to 2700 atm, 2700 atm to 2800 atm, 2800 atm to 2900 atm, 2900 atm to 3000 atm, 3000 atm to 3100 atm, 3100 atm to 3200 atm, 3200 atm to 3300 atm, 3300 atm to 3400 atm, 3400 atm to 3500 atm, 3500 atm to 3600 atm, 3600 atm to 3700 atm, 3700 atm to 3800 atm, 3800 atm to 3900 atm, 3900 atm to 4000 atm, 4000 atm to 4100 atm, 4100 atm to 4200 atm, 4200 atm to 4300 atm, 4300 atm to 4400 atm, 4400 atm to 4500 atm, 4500 atm to 4600 atm, 4600 atm to 4700 atm, 4700 atm to 4800 atm, 4800 atm to 4900 atm, 4900 atm to 5000 atm. The concentration of the first α-olefin may similarly be varied by varying the pressure of the co-monomer in the reaction system.

A catalytic amount of a group IV catalyst is provided to assist in the production silyl-functionalized polyolefins. As used herein, the term group IV catalysts refers to any group IV compound formed around a group IV element such as titanium or zirconium. Also as used herein, a catalytic amount refers to an amount of catalyst operable to encourage the co-polymerization of the first silicon-containing α-olefin with the second α-olefin.

In one embodiment, the group IV catalyst comprises a group IV metallocene complex in accordance with one of the structures presented below where I=[$Cp'_2ZrCH_3$][$CH_3B(C_6F_5)_3$] where Cp'=η-$C_5Me_5$, II=[$Cp_2ZrMe$][$MeB(C_6F_5)_3$] where Cp=η-$C_5H_5$ and III=[$Cp"_2ZrCH_3$][$CH_3B(C_6F_5)_3$] where Cp"=1,2-$C_5Me_2H_3$.

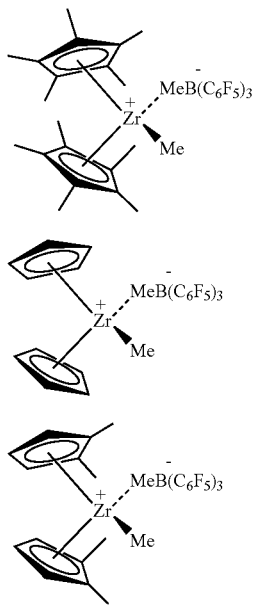

I

II

III

In another embodiment, the group IV catalyst comprises a group IV constrained geometry catalyst (CGC) in accordance with one of the structures presented below where IV=Me$_2$Si(C$_5$Me$_4$)(N$^t$Bu)MCl$_2$ wherein M=Ti, V=Me$_2$Si(C$_5$Me$_4$)(N$^t$Bu)MCl$_2$ wherein M=Zr, VI=Me$_2$Si(C$_5$Me$_4$)(N$^t$Bu)MCH$_3$][CH$_3$B(C$_6$F$_5$)$_3$] wherein M=Ti, and VII=Me$_2$Si(C$_5$Me$_4$)(N$^t$Bu)MCH$_3$][CH$_3$B(C$_6$F$_5$)$_3$] wherein M=Zr.

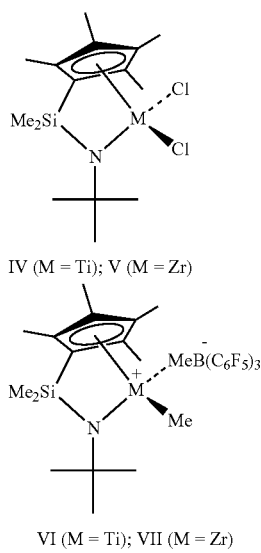

IV (M = Ti); V (M = Zr)

VI (M = Ti); VII (M = Zr)

Such catalysts can be produced by methods known in the art. For example catalysts I, II, and III may be produced by following the procedure described in Yang, X.; Stern, C.; Marks, T. J. *J. Am. Chem. Soc.* 1994, 116, 10015. Catalysts IV and V can be produced, for example, by following the disclosure of U.S. Pat. No. 5,132,380 to Stevens et al. Additionally, group IV catalysts VI and VII may be produced by reacting the corresponding dimethyl CGC compound with tris(pentafluorophenyl)borane, B(C$_6$F5)$_3$. For example, catalyst VI can be produced by charging Me$_2$SiCp"(N$^t$Bu)TiMe$_2$ (0.40 g, 1.23 mmol) and B(C$_6$F$_5$)$_3$ (0.63 g, 1.23 mmol) into a 25 mL reaction flask in a glove box. Using a vacuum line, 20 mL of pentane can be vacuum-transferred into the flask at about −78° C. The mixture can then be warmed to ambient temperature, stirred for approximately 1.5 hours, filtered and dried. Similarly, catalyst VII can be produced Me$_2$SiCp"(N$^t$Bu)ZrMe$_2$ (0.60 g, 1.6623 mmol) and B(C$_6$F$_5$)$_3$ (0.83 g, 1.62 mmol) into a 25 mL reaction flask in a glove box. Using a vacuum line, 20 mL of pentane can be vacuum-transferred into the flask at about −78° C. The mixture can then be warmed to ambient temperature, stirred for approximately 20 hours, filtered and dried.

As discussed above, a catalytic amount of the group IV catalyst sufficient to encourage the copolymerization of vinylsilanes is added to the reaction. In one embodiment, the group IV catalyst is also mixed with a co-catalyst. As used herein, the term co-catalyst includes any compound capable of alkylating the group IV element contained in the group IV catalyst. Examples of co-catalysts as used herein include alumoxanes, modified alumoxanes and aluminum alkyls. For example, in one embodiment, the co-catalyst comprises methylalumoxane (MAO). In such an embodiment, MAO is added at a ratio of group IV catalyst to MAO of 1:50 or greater such as at a range between 1:50 to 1:150 including ranges 1:50 to 1:60, 1:60 to 1:70, 1:70 to 1:80, 1:80 to 1:90, 1:90 to 1:100, 1:100 to 1:110, 1:110 to 1:120, 1:120 to 1:130, 1:130 to 1:140, and 1:140 to 1:150.

A solvent may additionally be incorporated into the copolymerization reaction to assist in the production of silyl-functionalized polyolefins. The solvent may be any chemical capable of assisting in the production of silyl-functionalized polyolefins by dissolving other compounds or advancing the reaction. For example, in one embodiment the solvent may comprise toluene, methylbenzene, or phenylmethane. In such an embodiment, toluene may be mixed with the first α-olefin such as, for example, vinylsilane, in an amount sufficient to assist in dissolving the vinylsilane. Other hydrocarbon and aromatic solvents, including hexane, heptane, octane, xylene, mesitylene, may also be used.

Copolymerization of Vinylsilanes with Ethylene

As comparison, the first α-olefin comprises vinylsilane CH$_2$=CHSiH$_3$ and the second α-olefin comprises ethylene. An exemplary method for producing silyl-functionalized polyolefins using vinylsilane and ethylene includes charging a measured amount, of a group IV catalyst (such as 1-2 mg) in a glove box into a flamed 25 mL round bottom flask equipped with a magnetic stirring bar. The vessel is then closed, removed from the glove box, and connected to the high vacuum line. A measured amount of toluene (such as about 15 mL) and vinylsilane (such as about 1-5 mL) is then condensed under vacuum at −78° C. With vigorous stirring, the mixture is warmed to the desired reaction temperature and maintained at that temperature while exposing it to ethylene. After a time sufficient for the copolymerization reaction to occur, the reaction is quenched by the addition of a small amount of methanol. The precipitated polymer is collected by filtration, washed with acidified methanol and acetone, dried under high vacuum, and weighed to determine the yield.

EXAMPLE 1

Copolymerization of vinylsilanes with ethylene was performed using group IV metallocene complexes. All manipulations of air-sensitive materials were performed with the rigorous exclusion of oxygen and moisture in flamed Schlenk-type glassware on a dual manifold Schlenk line, or interfaced to a high vacuum (10$^{-5}$ torr) line, or in a dinitrogenfilled Vacuum Atmosphere glove box with a high capacity recirculator (1-2 ppm $O_2$). Argon (Matheson, pre-purified), ethylene (Matheson, CP), and propylene (Matheson, PP) were additionally purified by passage through a supported MnO oxygen-removal column and a Davison 4 Å molecular sieve column. Ether solvents (THF, $Et_2O$) were distilled under nitrogen from sodium benzophenone ketyl. Hydrocarbon solvents (toluene, pentane) were distilled under nitrogen from Na/K alloy. All solvents for vacuum line manipulations were stored in vacuo over Na/K alloy in resealable flasks.

In the presence of a catalytic amount of [$Cp'_2ZrCH_3$][$CH_3B(C_6F_5)_3$] where $Cp'=\eta-C_5Me_5$ (I) in toluene, vinyltrimethylsilane underwent rapid co-polymerization with ethylene at room temperature to yield silyl-functionalized polyethylenes. The polymers were collected by filtration, washed with acidified methanol and acetone, and dried under vacuum. The results are summarized in Table 1 presented below where $M_n$ is the number average molecular weight in g/mol, $M_w$ is the weight average molecular weight in g/mol and $M_w/M_n$ provides the polydispersity index.

TABLE 1

Copolymerization of ethylene with $CH_2$=CH—R catalyzed by [$Cp'_2ZrCH_3$][$CH_3B(C_6F_5)_3$] where $Cp' = \eta-C_5Me_5$

| Entry | R | Silane Monomer (mL) | Ethylene (atm) | Toluene (mL) | Reaction Time (min.) | Yield (mg) | Co-monomer Incorp. (mole %)[b] | $M_n{}^c$ | $M_w/M_n{}^c$ |
|---|---|---|---|---|---|---|---|---|---|
| 1 | $SiMe_3$ | 1 | 1.0 | 20 | 360 | 450 | ~0.1 | 62,300 | 2.91 |
| 2 | $SiMe_3$ | 1 | 1.0 | 10 | 300 | 270 | ~0.1 | 24,700 | 2.24 |
| 3 | $SiMe_3$ | 3 | 0.25 | 3 | 60 | 20 | 1.1 | 9,540 | 4.98 |
| 4 | $SiMe_2(NMe_2)$ | 1 | 0.5 | 10 | 10 | 180 | 1.0 | 46,300 | 5.88 |
| 5 | $SiMe_2(NMe_2)^d$ | 1 | 0.25 | 0 | 60 | 180 | 1.6 | 3,600 | 5.36 |
| 6 | $SiMe_2(OTMS)$ | 1 | 0.5 | 10 | 90 | 260 | 0.5 | 49,200 | 2.46 |
| 7 | $SiMe_2(OTMS)$ | 2 | 0.5 | 10 | 60 | 260 | 0.5 | 23,600 | 2.87 |
| 8 | $SiMe_2(OTMS)$ | 3 | 0.25 | 0 | 1200 | 260 | 5.4 | 8,600 | 4.19 |
| 9 | $SiMe_2(O_tBu)$ | 1 | 0.5 | 10 | 4 | 150 | 0.5 | 59,300 | 4.08 |
| 10 | $Si(OMe)_3$ | 1 | 0.5 | 10 | 20 | 100 | 1.0 | 10,00 | 3.06 |

[a]All the polymerization reactions were carried out at 23° C. with [$Cp'_2ZrMe$][$MeB(C_6F_5)_3$] (10 mg. 0.011 mmol) unless otherwise indicated;
[b]Silane monomer incorporation in the copolymers based on $^1$H-NMR spectrum;
[c]Determined by GPC analysis using polystyrene as a standard;
[d]Catalyst is $CP'_2SmH$ (10 mg. 0.024 mmol)

Deuterated solvents were obtained from Cambridge Isotope Laboratories (all 99 atom % D) and were freeze-pump-thaw-degassed and dried over Na/K alloy.

$CH_2CHSiMe_3$, $CH_2$=$CHSiMe_2Cl$, and $CH_2$=$CHSi(OMe)_3$ were purchased from a commercial source and dried prior to use. $CH_2$=$CHSi(CD_3)_3$ was prepared from reaction of $CH_2$=$CHSiCl_3$ with $CD_3MGI$ in $^nBu_2O$, purified by distillation. $CH_2$=$CHSiMe_2(NMe_2)$, $CH_2$=$CHSiMe_2(O^tBu)$, and $CH_2$=$CHSiMe_2(OTMS)$ were prepared by the reaction of $CH_2$=$CHSiMe_2Cl$ with $LiNMe_2$, $LiO^tBu$, and LiOTMS, respectively, in $Et_2O$. All the substrates were purified by distillation, dried by stirring over $CaH_2$ for 24 hours, and transferred under vacuum to a storage tube containing a 4 Å molecular sieve. The group IV compounds [$Cp'_2ZrCH_3$][$CH_3B(C_6F_5)_3$] where $Cp'=\eta-C_5Me_5$ (I), [$Cp_2ZrMe$][$MeB(C_6F_5)_3$] where $Cp=\eta-C_5H_5$ (II), [$Cp''_2ZrCH_3$][$CH_3B(C_6F_5)_3$] where $Cp'=1,2-C_5Me_2H_3$ (III), $Me_2Si(C_5Me_4)(N^tBu)MCl_2$ (M=Ti, (IV); M=Zr, (V)), and $Me_2Si(C_5Me_4)(N^tBu)MCH_3$][$CH_3B(C_6F_5)_3$] (M=Ti, (VI); M=Zr, (VII)) were prepared from the literary procedures discussed above. Methylalumoxane (MAO) was obtained as a toluene solution from Sigma-Aldrich® and used as a solid. NMR spectra were recorded on either a Varian XVR 300 (FT, 300 MHz, $^1$H; 75 MHz, $^{13}$C) or a Varian UNITYplus-400 (FT, 400 MHz, $^1$H; 100 MHz, $^{13}$C, 79.5 MHz, $^{29}$Si) instrument, and chemical shifts for $^1$H, $^{13}$C, $^{29}$Si are referenced to internal solvents. The percentage of silyl monomer incorporation in the polymer was calculated based on the integrals of the corresponding resonances in its $^1$H NMR spectrum. Gel Permeation Chromatography (GPC) analysis of polymer samples was performed at elevated temperatures on a Waters 150 CV plus chromatography equipped with a refractive index detector and a capillary viscometer using universal calibration with polystyrene standards.

$^1$H-NMR spectra of the polymers, recorded in trichlobenzene/$C_2D_2Cl_4$ at 140° C., revealed the incorporation of silyl monomer in the polymer. A resonance at 0.05 ppm was characteristic of trimethyl silyl group, and the intense signal at 1.32 ppm was assigned to the polyethylene protons. That the presence of the $SiMe_3$ moiety in the product was not a simple physical mixture of polymer or oligomer of vinyltrimethylsilane with polyethylene was verified by the fact that there was no intensity change of the trimethyl silyl peak relative to the resonance of polyethylene in the $^1$H NMR spectrum after it was re-dissolved in trichlorobenzene and precipitated by the addition of methanol. Similar tests were applied to the other polymeric products and it was found that the increase of the concentration of vinyltrimethylsilane in the solution caused a decrease in the molecular weight of the polymer; although the effect on the percent incorporation of $SiMe_3$ in the copolymer was trivial (Entry 1-2 in Table 1).

Polar vinylsilanes may also be copolymerized with ethylene in the presence of a catalytic amount of catalyst I to yield silyl-functionalized polyethylene. Due to the extremely electrophilic character of the metal center, bulky polar groups (—$NMe_2$, —OTMS, —$O_tBu$) on the silicon of vinylsilanes may act as "masking" groups to prevent the coordination of the heteroatom to the metal center and deactivating the catalyst.

As shown in Entry 1-3 of Table 1, vinyltrimethylsilane as disclosed in JP2008-177912 had a poor co-monomer incorporation rate (entry 1-2) unless high silane monomer content was added which however resulted in very poor yield and low $M_n{}^c$(entry 3). As shown in entry 4-10 of Table 1, the silyl monomers underwent copolymerization with ethylene to produce high molecular weight silyl functionalized polyethylene. The increase of the silane monomer concentration also led to the formation of polymers with a higher percentage of silane monomer incorporation and a lower molecular weight (entries 6-8 in Table 1). For example, copolymers with a molecular weight, silane monomer incorporation and polydispersity similar to SiMe$_3$ were obtained when ethylene was copolymerized with CH$_2$=CHSiMe$_2$(NMe$_2$), CH$_2$=CHSiMe$_2$(OTMS) or CH$_2$=CHSiMe$_2$(O$^t$Bu) (entry 4, 6, 9 on Table 1). This may be due to their comparable steric hindrance. The direct polymerization of CH$_2$=CHSi(OMe)$_3$ with ethylene is probably due to the "de-shielding" effect exerted from the five methyl groups on the cyclopentadienyl ring of I, which may prevent the polar silyl group from approaching the metal center.

Without intending to be bound by a particular theory, it is believed that at least two strategies may be exploited to increase the incorporation of vinylsilane monomer into the copolymer. One approach is to use a more sterically open catalyst with less steric discrimination between different monomers. The second approach, which will be discussed in more detail below, is to reduce the rate of olefin insertion by using more sterically hindered olefins than ethylene, such as propylene or 1-butene.

EXAMPLE 2

In one embodiment, group IV Constrained Geometry Catalysts (CGC), in which one cyclopentadienyl (Cp) ring was replaced by a sterically less encumbered amide group, was used to test the first approach. The use of these catalysts resulted in a substantial increase of silyl monomer incorporation in the copolymer as seen in Table 2 presented below where $M_n$ is the number average molecular weight in g/mol, $M_w$ is the weight average molecular weight in g/mol and $M_w/M_n$ provides the polydispersity index.

TABLE 2

Copolymerization of Ethylene with Trimethylvinylsilane Catalyzed by Me$_2$SiCp"($^t$BuN)(MCl$_2$/MAO)$^a$ where Cp" = 1,2-C5Me2H3

| Entry | M  | Ethylene (atm) | Temperature (° C.) | Yield (g) | Co-monomer incorp. (mol %) | $M_n^c$ | $M_w/M_n^c$ |
|-------|----|----|----|-----|------|------|------|
| 11    | Ti | 1.0  | 23 | 0.9 | 35   | 5570 | 4.91 |
| 12    | Ti | 1.0  | 60 | 1.8 | 22   | 3351 | 2.73 |
| 13    | Ti | 0.25 | 0  | 1.4 | 1.5  | 5930 | 2.50 |
| 14    | Zr | 0.25 | 23 | 2.0 | 11   | 1092 | 1.63 |
| 15    | Zr | 0.5  | 60 | 2.2 | 25   | 704  | 1.32 |

$^a$All the polymerization reactions were carried out in trimethylvinylsilane (1 mL) and toluene (10 mL) with Me$_2$SiCp"($^t$BuN)(MCl$_2$/MAO (1:150) as catalysts;
$^b$Silane monomer incorporation in the copolymers based on $^1$H-NMR spectra;
$^c$Determined by GPC analysis with polystyrene as the standard.

Me$_2$Si(C$_5$Me$_4$)(N$^t$Bu)TiCl$_2$ (IV) when mixed with the methylalumoxane (MAO) (ratio: 1/50) catalyzed the copolymerization of SiMe$_3$ with ethylene in toluene at 23° C., producing a sticky polymer, which was moderately soluble in toluene at room temperature (entry 11 in Table 2). The $^1$H NMR spectrum recorded in toluene-d$_8$ reveals that as high as 35% of SiMe$_3$ was incorporated in the copolymer. Due to the relatively low molecular weight of the polymer, the end groups were observed by NMR spectroscopy.

When the polymerization temperature was increased to 60° C., vinylsilane incorporation decreased from 35% to 22% (entry 11, 12 in Table 2), and the molecular weight also decreased. The latter trend was consistent with the general observation that heat induces the polymer chain transfer via β-H elimination. A decrease in the silyl monomer incorporation in the copolymer was also observed when the polymerization temperature was lowered. Under otherwise identical conditions, the Me$_2$Si(C$_5$Me$_4$)(N$^t$Bu)ZrCl$_2$ (V)/MAO catalyst had a lower activity than that of the Ti congener at room temperature, and gave polymers with a lower molecular weight and a lower silane incorporation. However, raising the temperature increased polymerization activity and the silyl monomer incorporation in the polymer. The polymers obtained with the Zr catalyst had a similar microstructure to those obtained with the Ti catalyst. The cationic complexes [Me$_2$Si(C$_5$Me$_4$)(N$^t$Bu)MCH$_3$][CH$_3$B(C$_6$F$_5$)$_3$] (M=Ti; VI; Zr, VII) also catalyzed the copolymerization of ethylene with SiMe$_3$, yielding similar copolymers as Me$_2$Si(C$_5$Me$_4$)(N$^t$Bu)MCl$_2$/MAO, but at a lower activity.

Copolymerization of Vinylsilanes with Propylene

In another embodiment the first α-olefin comprises vinylsilane and the second α-olefin comprises propylene. The use of more sterically hindered propylene may reduce the olefin insertion rate and increase the vinylsilane monomer incorporation into the copolymer.

In one exemplary method for copolymerization of vinylsilanes with propylene, a flamed 25 mL round bottom flask equipped with a magnetic bar, was loaded with the catalyst in the glove box. The vessel was closed, removed from the glove box, and connected to a high vacuum line. Measured amounts of toluene and vinylsilane were then condensed into the flask at −78° C. The mixture was warmed to room temperature (23° C.), and exposed to propylene (1 atm) while stirring vigorously. After a measured reaction time, the polymerization was quenched by the addition of a small amount of methanol. The volatiles were removed under vacuum, and the polymer residue was extracted with hot hexane, recovered by evaporation of the solvent, dried under high vacuum, and weighed to determine the yield.

EXAMPLE 3

The use of propylene as a more bulky olefin was tested as a second way to increase the incorporation of silane monomer in the copolymer. As shown in Table 3, the copolymerization of vinyltrimethylsilane with propylene (1 atm) greatly increased the silyl monomer incorporation ratio in the obtained polymer/oligomer, not only with the use of sterically more opened CGC catalysts VI, VII, but also with the metallocene catalysts I, II, and III.

TABLE 3

The copolymerization vinyltrimethylsilane with propylene (1 atm)

| Entry | Catalyst | Vinyl (mL) | Toluene | Time | Yield | Incorp. of 1 (mol %)$^b$ | $M_n^c$ | $M_w/M_n^c$ |
|-------|----------|------|---------|------|-------|------|-----|------|
| 1 | I   | 1 | 10 | 1.5 | 3.5 | 0.8 | 465 | 1.35 |
| 2 | I   | 4 | 2  | 20  | 2.8 | 11  | 402 | 1.36 |
| 3 | II  | 1 | 10 | 60  | 1.5 | 13  | 243 | 1.36 |
| 4 | III | 1 | 10 | 20  | 0.4 | 20  | 510 | 1.21 |
| 5 | VI  | 1 | 10 | 60  | 0.6 | 12  | 851 | 2.23 |
| 6 | VII | 1 | 10 | 120 | 1.3 | 16  | 296 | 1.57 |

$^a$The polymerization reactions were carried out in toluene (10 mL) with 0.01 mmol of catalyst;
$^b$Silane monomer incorporation in the copolymers by $^1$H-NMR;
$^c$Determined by GPC analysis with polystyrene as the standard.

The silyl monomer incorporation can be increased by raising the monomer concentration (entry 2 in Table 3), but at the sacrifice of the polymerization activity. In contrast, the incorporation of SiMe₃ into the copolymer was much greater with catalysts II, III, VI or VII under identical conditions. However, there was no apparent correlation between the ratio of silyl monomer incorporation in the copolymer/oligomer and the steric unsaturation of the catalysts.

It is noted that terms like "specifically," "preferably," "commonly," and "typically" and the like, are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A method of producing a silyl-functionalized polyolefin comprising reacting a first functionalized olefin having the formula:

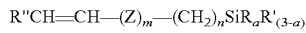

where Z is an electron withdrawing moiety, m is 0 or 1, n is an integer from 0-30, R is independently selected from the group consisting of alkoxy group and amine group, a has a value in the range 1 to 3 inclusive; R' represents an hydrocarbyl group, R" represents H or a group having an electron withdrawing effect or any other activation effect with respect to the —CH=CH— bond or a moiety containing an aromatic ring or a C=C bond conjugated with the —CH=CH— with an α-olefin having the general formula $C_xH_{2x}$, where x is an integer between 1-30, in the presence of a catalytic amount of a group IV catalyst, wherein the group IV catalyst comprises a group IV metallocene complex, for a time sufficient to produce a silyl-functionalized polyolefin, wherein the first functionalized olefin is incorporated in the silyl-functionalized polyolefin in from about 0.1 to about 25 mole %, wherein the group IV metallocene complex has the formula: $[(C_5Me_5)_2ZrMe][MeB(C_6F_5)_3]$; $[(1,2-C_5Me_2H_3)_2ZrMe][MeB(C_6F_5)_3]$; or $[(C_5H_5)_2ZrMe][MeB(C_6F_5)_3]$.

2. The method of claim 1 wherein the α-olefin is selected from the group consisting of ethylene and propylene.

3. The method of claim 1 wherein the co-catalyst comprises methylalumoxane.

4. A method of producing a silyl-functionalized polyolefin comprising reacting a first functionalized olefin having the formula:

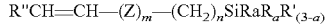

where Z is an electron withdrawing moiety, m is 0 or 1, n is an integer from 0-30, R is independently selected from the group consisting of alkoxy group and amine group, a has a value in the range 1 to 3 inclusive; R' represents an hydrocarbyl group, R" represents H or a group having an electron withdrawing effect or any other activation effect with respect to the —CH=CH— bond or a moiety containing an aromatic ring or a C=C bond conjugated with the —CH=CH— with an α-olefin having the general formula $C_xH_{2x}$, where x is an integer between 1-30, in the presence of a catalytic amount of a group IV catalyst, for a time sufficient to produce a silyl-functionalized polyolefin, wherein the first functionalized olefin is incorporated in the silyl-functionalized polyolefin in from about 0.1 to about 25 mole %, wherein the group IV catalyst comprises a group IV constrained geometry catalyst (CGC) and wherein the group IV CGC has the formula: $Me_2Si(C_5Me_4)(NtBu)MCl_2$; or $Me_2Si(C_5Me_4)(NtBu)MCH_3][CH_3B(C_6F_5)_3]$; where M is selected from the group consisting of titanium and zirconium.

5. A method of producing a silyl-functionalized polyolefin comprising reacting a first functionalized olefin having the formula:

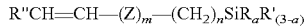

where Z is an electron withdrawing moiety, m is 0 or 1, n is an integer from 0-30, R is independently selected from the group consisting of alkoxy group and amine group, a has a value in the range 1 to 3 inclusive; R' represents an hydrocarbyl group, R" represents H or a group having an electron withdrawing effect or any other activation effect with respect to the —CH=CH—bond or a moiety containing an aromatic ring or a C=C bond conjugated with the —CH=CH—with an α-olefin having the general formula $C_xH_{2x}$, where x is an integer between 1-30, in the presence of a catalytic amount of a group IV catalyst, for a time sufficient to produce a silyl-functionalized polyolefin, wherein the first functionalized olefin is incorporated in the silyl-functionalized polyolefin in from about 0.1 to about 25 mole %, wherein m is 1, Z is C(O)O—and n is comprised between 1 and 6, a is 3 and R is an alkoxy group.

6. The method of claim 1 wherein the silyl monomer incorporation is greater than 0.5 molar percent in the resulting polymer.

7. The method of claim 4 wherein the CGC is mixed with a co-catalyst comprising methylalumoxane at a molar ratio of 1:50 or higher.

8. The method of claim 1, wherein a solvent is present and the solvent is selected from the group consisting of toluene, xylene, mesitylene, hexane, heptane, octane, and combinations thereof.

* * * * *